June 30, 1970  E. E. SHELDON  3,517,665
NEGATIVE PRESSURE TREATMENT DEVICE
Filed June 28, 1967  2 Sheets-Sheet 1
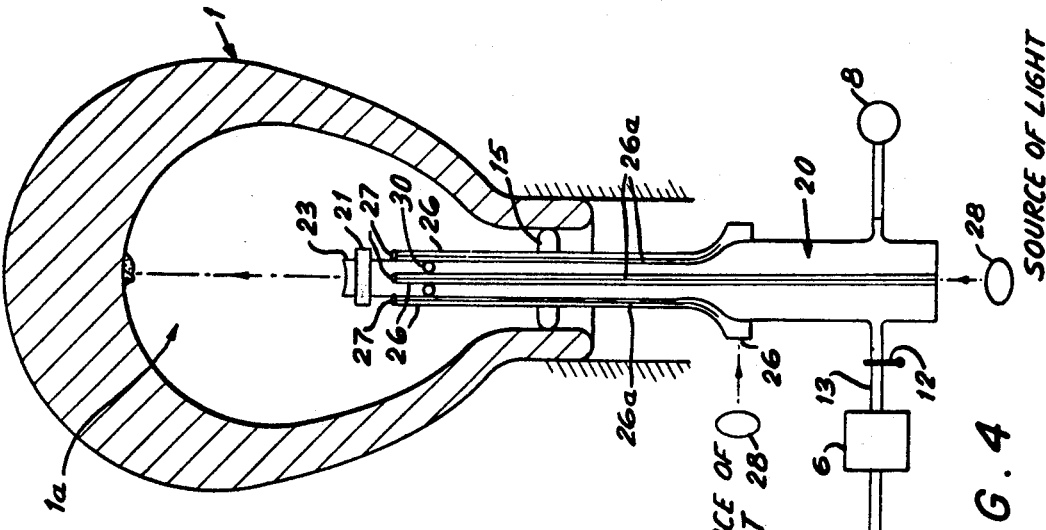
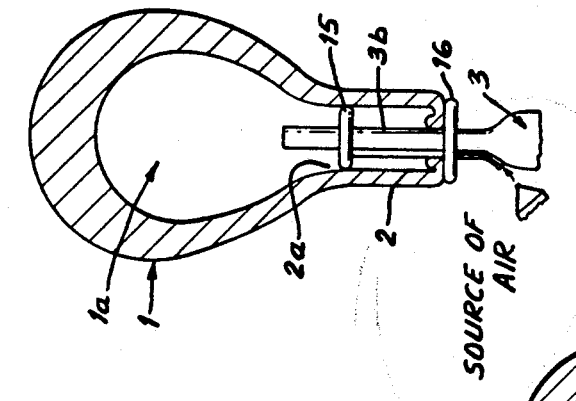
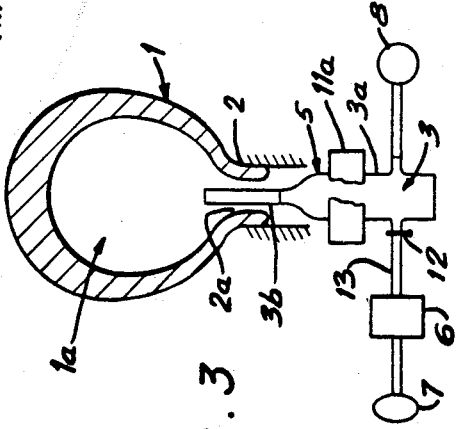
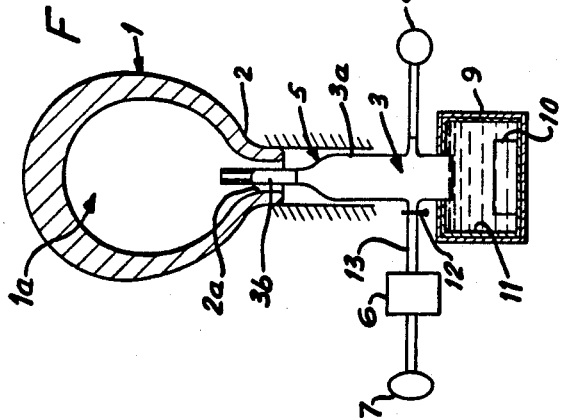
INVENTOR.
EDWARD EMANUEL SHELDON
Polachek & Saulsbury
ATTORNEYS June 30, 1970   E. E. SHELDON   3,517,665
NEGATIVE PRESSURE TREATMENT DEVICE
Filed June 28, 1967   2 Sheets-Sheet 2
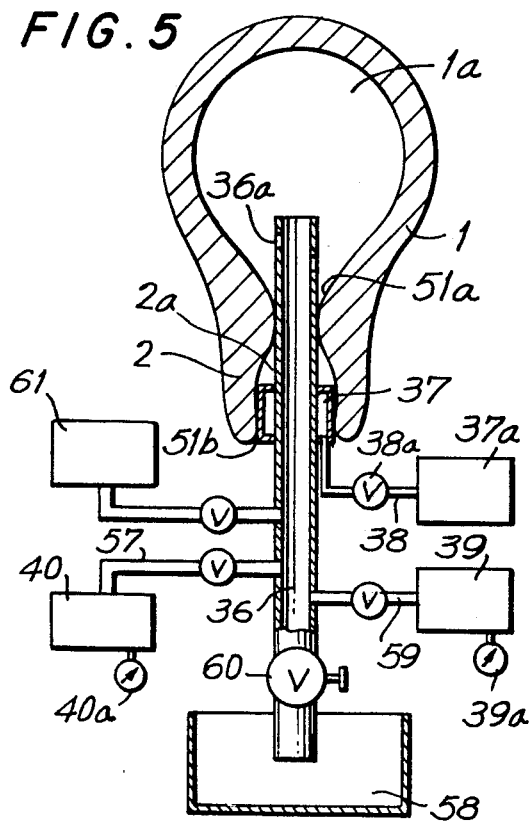
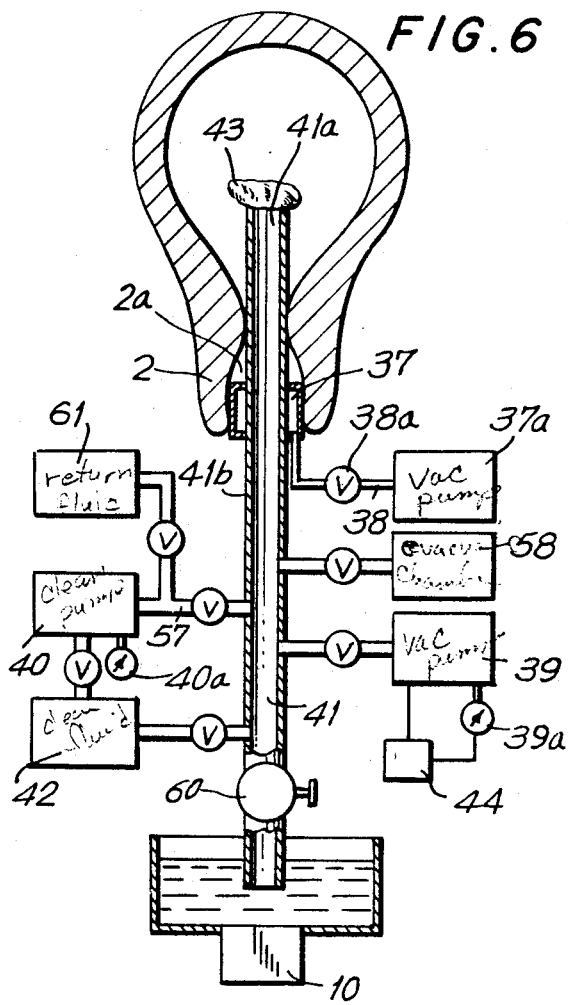
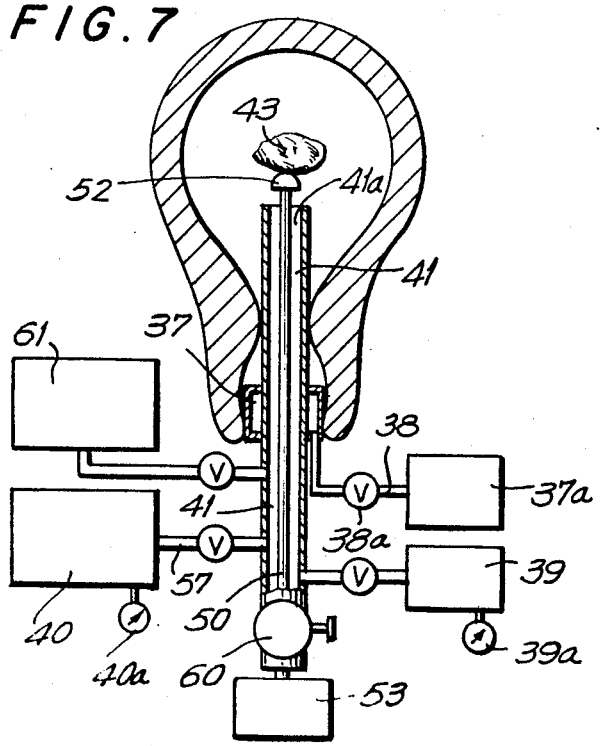
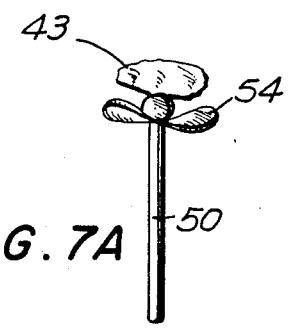
INVENTOR.
EDWARD EMANUEL SHELDON
Polachek & Saulsbury
ATTORNEYS

United States Patent Office 3,517,665
Patented June 30, 1970

3,517,665
NEGATIVE PRESSURE TREATMENT DEVICE
Edward Emanuel Sheldon, 30 E. 40th St.,
New York, N.Y. 10016
Filed June 28, 1967, Ser. No. 649,504
Int. Cl. A61m 1/00
U.S. Cl. 128—24       7 Claims

ABSTRACT OF THE DISCLOSURE

A device for treatment of hollow organs which comprise means for producing a negative pressure within the cavity of said organs, either alone or in combination with fluids containing medicinal compounds. In addition, in some embodiments of invention sonic energy is used to increase the effects of said negative pressure and of said fluids.

---

This invention relates to the novel method and device for treatment of infections and of tumors benign and malignant of the uterus and of other inaccessible organs. The present treatment of the chronic infection of the cervix of the uterus or of the body of the uterus is very ineffective. This condition is chronic and does not respond well to any form of treatment. In view of the fact that chronic infection of the cervix is a strongly predisposing factor for the development of the cancer of the cervix which is one of the most frequent sites of cancer in women, there is an urgent need for the improvement of therapy in this field.

My novel device, for treatment of remote organs such as uterus uses supersonic waves for the treatment of pathological conditions. It should be understood, however, that my device may be also used for the treatment of other remote organs. It was found that the supersonic waves of the frequency between 5000 kc. and 100,000 kc. produce beneficial effects in the chronic infection of the mucosa lining the inside surface of organs.

It was furthermore found that the efficiency of treatment by means of fluids containing medicines or ointments is greatly increased by a simultaneous use of supersonic radiation. It is believed that this improvement in therapeutical effects of medicines, which are rather ineffective at present, resides in the ability of solution of said medicines to penetrate in the most inaccessible recesses of the mucosa membrane and reach thereby all foci of infection.

It should be also understood that my invention is not limited to any particular frequency of supersonic waves and that many modifications of the type of supersonic waves come within the scope of my invention.

The invention will be better understood when taken in combination with the accompanying drawings.

In the drawings FIG. 1 represents the novel treatment device.

FIG. 2 represents a modification of said device.

FIG. 3 represents another modification of the treatment device.

FIG. 4 represents a modification of the treatment device, which comprises a source of light for focusing on the pathological area.

FIG. 5 shows modification of invention in which negative pressure pump is used for evacuation.

FIG. 6 shows modification of invention in which negative pressure means are combined with the use of chemical fluids and sonic energy.

FIG. 7 shows modification in which mechanical means are used to produce breakdown of evacuated matter.

FIG. 7a shows another modification of mechanical means for the breakdown of evacuated matter.

FIG. 1 represents the novel device 5 for treatment of the uterus and of the cervix. The device 5 comprises a source of supersonic energy 10, which may be in the form of a piezoelectric transducer such as quartz or ceramic. It may be also in the form of a magnetostrictive or ferroelectric transducer. It may be also in the form of an air whistle supersonic generator such as Hartmann generator, or it may be in the form of jet fluid supersonic generator, such as J.E. Vibrating Reed supersonic generator manufactured by Sonic Engineering Company. In the simplest form, the supersonic source 10 may be made of Langevin's sandwich, or of a focused ceramic transducer. It should be understood that all types of supersonic generators may be used in my invention.

The supersonic generator 10 may be mounted in the tank 9 which is disposed outside of the patient's body and contains a sterilized liquid such as water, saline, oil or fluid containing medicines. The novel uterine adaptor 3 has a wide portion 3a and a narrow portion 3b. The wide portion 3a extends from the tank 9 to the cervix of uterus 2. The narrow part 3b extends from the external orifice of the cervix into the cervical canal 2a or beyond into uterine cavity. The adaptor 3 may be made of a plastic or of a metal. The plastic such as Teflon was found to be very suitable for the purposes of this invention. The narrow part 3b of the adaptor 3 is introduced into the cervical canal 2a and is anchored there by means of an inflatable ring 15 or by means of a suction cup 16, to be described later. The adaptor 3 is connected by means of tubing 13 to the source of fluid 6 such as sterilized water, saline, or medicated solution. The source of fluid 6 is connected to the pumping unit 7. The stopvalve 12 controls the flow of fluid into adaptor 3. After the adaptor 3 is inserted into the cervical canal, the valve 12 is opened and the fluid is directed into the uterine cavity 1a. The uterine cavity has a variable size but usually it has the size of the order of a few cubic inches only. The uterine cavity 1a has to be filled with fluid but overdistension should be avoided to prevent escape of the fluid into Fallopian tubes. The manometer 8 connected to the adaptor 3 serves to regulate the amount of fluid. It was found that the pressure of fluid should not exceed 200 mm. Hg. After the uterine cavity has been filled with liquid, the adaptor 3 is coupled to the sonic generator 10 by immersing its outside end in the tank 9. The tank 9 is provided with walls 11 made of material which is reflecting for supersonic waves such as cork or rubber mixed with tungsten chips. The reflecting walls 11 cause production of standing supersonic waves. This arrangement is important for the efficiency of the therapy as the multiplicity of reflected supersonic waves insures that each recess of the uterine cavity will be reached by some supersonic waves. The supersonic waves generated in tank 9 are transmitted into the fluid contained in the adaptor 3 and can reach therefore the uterine cavity 1a without attenuation.

In some cases the tank 9 may be omitted and the adoptor may be coupled directly or by means of an intervening oil film to the transducer 10. It was found that in such case the walls of adaptor 3 should be coated with material reflecting supersonic waves, as was explained above.

It should be understood that the supersonic generator may operate by a pulse waves or in a continuous manner. In addition, it was found that the intensity of supersonic waves should not exceed 10 watts/cm.$^2$. It was found that such treatments of a few minutes duration provided to be beneficial to patients suffering from chronic inflammations of the cervix and the uterus. It should be understood, however, that my invention is not limited to the treatment of the uterus but it may be applied to other inaccessible organs as well.

In some cases the adaptor 3 must be provided with means for blocking the lumen of the cervical canal in order to prevent the escape of fluid from the uterine cavity. This was accomplished by making the walls of the narrow section 3b of the adaptor 3 much thinner than the rest of the adaptor so that they may distend under the pressure of the injected fluid and close thereby the cervical canal. In some cases it is preferable to make the walls of the thin part 3b of a different material than the rest of the adaptor, for example, of a distensible rubber or plastic. In other cases it is preferable to anchor the adaptor 3 in the cervical canal and to block off the cervical canal by using an inflatable member such as ring 15, which is connected to an outside source of air. This construction is shown in FIG. 2. The inflatable ring 15 surrounds the adaptor part 3b. When it is inflated it will close the space between said adaptor 3b and walls of the uterine canal 2a.

In other cases it is preferable to use instead of a ring 15, or in addition to it, a suction cap 16 which is mounted on the adaptor 3 and which will adhere to the outside orifice of the cervical canal 2a blocking thereby the escape of fluids from the uterine cavity.

Another modification of my invention is shown in FIG. 3. In this embodiment of invention the supersonic generator 11a surrounds the part of the adaptor 3 which is outside of patient's body. The supersonic generator 11a may be one of piezoelectric ceramics or of ferrites and may have a cylindrical or semi-cylindrical shape which will cause focusing of the supersonic waves into fluid contained in the adaptor 3. This arrangement is useful in cases in which the fluid in the uterine cavity is forced to circulate continuously through the adaptor 3. Any pathogenic organisms flushed out of recesses of mucosa membrane will be brought into the region of focused supersonic radiation and will be destroyed by said strong supersonic radiation. This arrangement permits the use of powerful supersonic radiation without endangering patient's tissues, which was not possible in the previously described embodiments of invention. In some cases the introduction of the adaptor 3 or 20 into the uterine cavity may be difficult. In such cases the adaptor 3 or 20 will be positioned in the adjacent organ such as vagina. The supersonic waves will propagate from vagina into uterus. This method is not as efficient as the ones described above but it may be in some cases the only proper way to treat the patient.

Another modification is shown in FIG. 4. In this embodiment 25 of invention the supersonic generator 21 is placed within the uterine cavity or within any other organ to be treated. The adaptor 20, which is similar to the adaptor 3 described above, is introduced into the uterine cavity 1a. The adaptor 20 is connected to the source of fluid 6 which is again connected to a pumping member 7 as was described above. The adaptor 20 is provided with a small supersonic generator 21 mounted on its distal end, which is within the organ to be treated. The supersonic generator 21 may be of any type as was explained above. The supersonic generator 21 may have a plano-concave shape to focus the emitted beam of supersonic energy. The generator 21 is connected to the outside source of electrical potential as it is well known in the art. In some cases a small plano-concave lens 23 such as of a metal or a plastic such as polystyrene may be attached to the generator 21 for better focusing of the supersonic beam. The size and shape of the supersonic lens 23 will depend on the area on which the supersonic beam from the generator 21 has to be focused. As the size of the lesion can be determined before the treatment by using one of my endoscopic devices, it is possible to select a proper lens for each patient before the treatment. This feature is an important part of my invention as it permits to confine the supersonic beam to diseased area.

The adaptor 20 is provided in addition with fiberoptic fibers 26a of glass or plastic which conduct the light. The fibers 26 may surround the circumference of the adaptor 20 or may be in the form of a few separate bundles 26, each of said bundles being attached to one side of the adaptor 20. Each bundle 26 of fibers is provided with a miniature lens 27 to focus the light emitted by said bundle onto the wall of the uterus. The fibers 26a receive their light from the source of light 28 which is mounted outside of the patient's body. In the operation of my device the fine beam of focused light projected by one of the lenses 27 is directed to the center of the lesion under endoscopic control. The beam of supersonic energy has to cover said lesion. In this way the treatment device 25, once it is focused by means of the light beam from the lens 27 onto the diseased area, automatically delivers the beam of supersonic radiation to said pathological area. As the supersonic radiation beam is essentially confined to the lesion itself, it may be made very strong without endangering the rest of the treated organ.

The adaptor 20 is provided wtih openings 30 for introduction of fluid into uterine cavity 1a.

In some cases the focusing light may be mounted on the supersonic generator 21 instead of on the sidewalls of the adaptor 20, as was explained above. In other cases the focusing light may be mounted in the center of the adaptor 20 below the supersonic generator 21. In such case the supersonic generator 21 must be of a light transparent material such as quartz. In this preferred modification of my light focusing system, the bundle of illuminating fibers 26 and its focusing lens 27 are mounted in the center of the adaptor 20.

A further refinement of the treatment device 25 is to mount the supersonic generator 21 on the universal joint. The motion of universal joint may be controlled from the outside of the patient's body.

The treatment device 25 may be further improved by replacing one bundle 26 of illuminating fibers 26a with an endoscopic bundle of fibers which permits visual observation of the treated organ. The endoscopic bundle may be flexible or rigid and is constructed of light conducting fibers 26a which are coherently fixed at their ends. This means that the end-faces of all fibers are arranged in the same spatial relationship to each other at each end of the bundle 26. The endoscope bundle is provided with a focusing lens at its distal end and with a magnifying ocular at its proximal end. The focusing lens may be controlled from the outside of the patient. In some cases the endoscopic bundle may also carry its own illuminating means. The use of the endoscopic bundle permits visual observation of the focusing light from bundle 26 on the area to be treated.

It should be understood that the devices described above may be used for the treatment of other organs than the uterus, such as accessory nasal sinuses, biliary ducts, pancreatic ducts, urinary tract, etc. In particular the above described devices were found to be effective in breaking up stones in biliary passages, in urinary passages, in the pancreatic ducts and in salivary ducts. They will permit therefore to reduce the scope of surgery necessary for extraction of such stones.

In many cases the main medical problem resides in the need of a complete evacuation of the tissues and matter from the inside surface of walls and from the cavity of the organ. A novel device for the treatment and evacuation of the uterus is shown in FIG. 5. In this embodiment of invention instead of sonic energy, negative atmospheric pressure effects on the inner walls of the organ are used. It was found that negative pressure must be stronger than 0.5 of normal atmospheric pressure and preferably 0.9 of atmospheric pressure. The device comprises a hollow member 3 or 36 of essentially rigid material adapted in size and shape for the introduction into the cavity 1a of the uterus 1. The adaptor member 36 is open at its both ends, and has the walls rigid enough so that they will not collapse or occlude the lumen of said member when it is subjected to the negative pressure. The member 36 is introduced into organ 1 through its orifice and cervical canal 2a. One end of said adaptor member 3 or 36 is in the cavity of the organ and the opposite end is mounted outside of the body and is connected with an evacuating receptacle chamber 58. The adaptor 36 is also connected with the evacuating pump 39. The adaptor member 36 or 41 has narrow elongated shape and it was found that its length should be at least five times larger than its diameter. The adaptor member 36 is provided with a non-collapsible hollow connection 59 which is connected to the evacuating pump 39. As the negative pressures usually does not exceed 0.95 atmospheric pressure, in most cases mechanical pumps are sufficient for this purpose. Such evacuating pumps are known in the industry as "Fore" pumps or "Back-up pumps." They may be of any design available and usually consist of a rotary member and sliding vanes sealed in oil. The pumping action depends upon actual displacement of the gas or air. Such pumps are made by Cenco Comp. under the name of Hyvac or by Welch Scientific Comp. under the name Welch Duo-Seal type pumps. It should be understood that hydraulic pumps may be used also. Whatever pump is used to produce necessary negative pressure, it must have the capacity to produce a fast decrease of the pressure within the uterus. If this pressure is reduced gradually, the natural elasticity of living tissues will counteract and negate desired effects. The reduction of pressure should be therefore obtained in the time not longer than 1–2 minutes and preferably in only 10–20 seconds. The hollow member 36 is provided with air-tight valve 60 which may be closed completely or partially when the negative pressure is produced and which regulates the strength of said negative pressure.

In some cases the space between the orifices 51a and 51b of the organ 1 and the adaptor 36 or 41 must be sealed additionally to prevent the entry of air into cavity 1a and reestablishing thereby the normal pressure. To prevent this complication the adaptor 36 may be provided with a distensible member such as a bag or a cuff 37 which may be distended by air or fluid from a source 37a mounted outside of the body. The cuff 37 being distended will provide a good sealing of the orifice 51b. Another way to occlude the orifice of cervical canal and to prevent the entry of the outside air is to use a liquid plastic which solidifies at body temperature. The liquid plastic is deposited on the outside of the cervix and around the hollow member and seals off the orifice. The pump 39 is connected to a gauge 39a which measures the negative pressure. The pump 37a is connected to the bag or cuff 37 by means of a channel 38. The channel 38 is provided with a valve 38a to regulate the amount of air insufflation or of deflation. The initial strong negative pressure is essential to dislodge and separate the matter from the walls of the organ. This occurs by sudden inward movement of walls of the organ under influence of strong negative pressure which reduces the size of the cavity of the organ. Subsequent evacuation of said matter may require periodic re-admission of air into uterine cavity. The valves 38a and 60 serve for this purpose.

It should be understood that the use of occluding bag or cuff 37 applies to all embodiments of invention and represents an important feature of this invention. It was found that without such occluding means 37, the negative pressure cannot be produced in strength which is required in many cases. The adaptor 36 may have one or plural openings 36a on its sidewalls and an opening at its end. The member 36 should be preferably light transparent at least in the part which is outside of the body. If the glass is used for this purpose it must have special safety characteristics. It was found that the ordinary glass is not suitable for this purpose and a laminated glass or plastics should be used instead. In case of the rupture or implosion of the member 36 by sudden change of pressure, its fragments will be prevented from flying into adjacent tissues and causing serious injury. The laminated glass used for adaptor member 36 consists of at least 2 layers of glass bonded together with plastic material such as cellulose acetate or vinyl resin. Such laminated glass is also safe to be used in organs from the point of view of toxicity and allergy.

The entranace into the uterine cavity 1a is the cervical canal 2a which comprises two openings or orifices. The outside one called os externum 51b and the inner one 51a called os internum. The access for the instruments such as hollow member 3 or 36 into uterine cavity 1a is usually obtained by forceful dilatation of the cervical canal 2a in order to provide adequate space for instruments. The dilatation of the cervical canal 2a is a painful procedure which requires a local or a general anesthesia. One of the main features of the invention is the elimination of the need for such dilatation of the cervical canal 2a or orifices 51a and 51b of the uterus 1 prior to the treatment. This was made possible only by using the adaptors 31, 36 or 41 of the diameter smaller than 5 mm. and having the length at least 5 times larger than said diameter.

Another feature of this invention is the elimination of the exploration of the uterine cavity with the adaptor 36 or 41 in a search for retained contents. Such deep introduction and search requires dilatation of the cervical canal and it is one of the purposes of this invention to eliminate the need for this painful procedure. It was found that the use of adaptor 36 or 41 without the dilatation of the cervical canal requires a very strong negative pressure. In some cases the negative pressure must be 0.95 of atmospheric pressure or even stronger. It was found that the connecting channels 57 or 59 if made of rubber failed when using such strong negative pressure because of buckling or collapsing of walls of said channels. It was necessary to make all parts of the negative pressure system of semi-rigid or rigid materials such as metals, glass or special plastics. The use of a strong negative pressure requires means preventing the entry of outside air into uterine cavity 1a through the space between the adaptor 36 or 41 and walls of the cervical canal 2a. In some cases the contact betwen the adaptor 36 or 41 and walls of cervical canal 2a may be sufficient. In other cases it was found necessary to provide an inflatable or distensible member 37 such as a cuff or a bag on the outside circumference of the adaptor 36 or 41 to insure controllable occlusion as was explained above.

It was found however that the use of adaptor 36 or 41 of a small diameter causes complications due to inability of large particles of evacuated material to enter into said narrow adaptors.

To solve this problem in some cases means are provided for circulating the cleansing fluid to help the removal of solid particles. A separate pump 40 may be provided for this purpose and is connected to the adaptor 36 or 41 by channel 57. The flushing action of pump 40 may be used intermittently with the action of the negative pressure pump 39, and the receptacle 61 serves to receive returning fluid. The flushing fluid should preferably comprise chemical ingredients to dissolve blood clots which may form in the uterine cavity and obstruct the adaptor 36 or 41. In addition, various enzymes such as trypsine, fibrinolysin or papainase are of great importance to dissolve the solid particles 43 of the evacuated matter.

It was found that in some cases the circulation of the fluid is not sufficient to re-establish the passage for the evacuated material through the narrow adaptor 36 or 41. If the particles are larger than the diameter of the adaptor 36 they will not pass regardless of the power of the suction pump 39. The solution of this problem was found in the use of sonic energy producing means 10, described above. The sonic energy may be delivered into uterine cavity through the adaptor 41 which has the construction of adaptor 36, described above, but in addition has walls provided with material 41b which absorbs sonic energy such as rubber or cork in order to prevent escape of sonic energy to adjacent organs which may cause a damage in some cases. The sonic energy is produced by the sonic generator 10 described above. The generator 10 may be coupled to the fluid directly or by means of a diaphragm. The sonic energy from the generator 10 will be transmitted into the uterine cavity by means of said fluid as was explained above. The fluid may be injected into uterine cavity through the adaptor 36 or 41 by means of a pump 40 as was explained above. The fluid may circulate during sonic treatment or may be stationary. The sonic energy may be also transmitted into the uterine cavity filled with fluid by means of a sonic guide which is inserted into hollow adaptor 36 or 41 and provides the connection between the sonic generator 10 and fluid. The sonic guide should be preferably a solid rod of a dielectric material to prevent electrical hazards. If it is made of a metal it should have a good electrical insulation. The sonic treatment especially in combination with enzymes or other solvents in the fluid causes breakdown of particles 43 which are too large for the passage through adaptor 36 or 41 by negative pressure alone. The low frequency sonic energy such as 10–25 kc. is effective in breaking the particles 43 to a small size. The sonic treatment may be used intermittently with negative pressure treatment or it may be used after the negative pressure treatment was terminated.

It was found that the use of circulating fluid, as described above, in some cases was not sufficient to re-establish the free passage through the very narrow adaptor 36 or 41 which have the lumen smaller than 5 mm. and which are used in order to eliminate the necessity of forceful dilatation of the cervical canal. It was found that in some cases it is necessary to provide the fluid with a very strong concentration of proteolytic and fibrinolytic enzymes such as trypsin, fibrinolysin and papainase or other solvents. This strong concentration of enzymes or other solvents cannot be applied safely to the walls of organs. The solution of this problem requires another embodiment of the invention which is shown in FIG. 6. The adaptor 41 may be of the same narrow diameter as adaptor 36 and may have preferably the diameter smaller than 5 mm. The adaptor 41 is provided with only one opening 41a which is placed at the very end of said adaptor. The gauge 39a of the suction pump 39 indicates when the adaptor 41 becomes obstructed by a large particle 43. At this point, the suction pump 39 will stop and the pump 40 is activated. The fluid containing the enzymes or chemical solvents for dead tissues is injected into adaptor 41. In some cases it is preferable to maintain the action of the suction pump in order to maintain a weak negative pressure which will prevent the dislodging of the particle 43 from the opening 41a. In such case the fluid may reach the adaptor 41 by gravity alone without the help of circulating pump 40. The action of strong concentration of enzymes will cause dissolution of the obstructing particle 43. The re-establishment of the free passage through the adaptor 41 will manifest itself on the gauge 39a of the suction pump 39 or on gauge 40a of the circulating pump 40. It is very important to prevent the treatment fluid 42 with its strong enzymes from entering into uterine cavity. Therefore, automatic control circuit is provided which upon receiving the pre-determined signal from the gauge 39a will increase the suction power of the pump 39 so that the fluid 42 will be immediately sucked back. The regulator 44 is connected for this purpose to the gauge 39a and to the suction pump 39. The advantage of this construction resides in the possibility of using strong solvents without the danger to organs.

It was found that in some cases the chemical action of enzymes is too slow and that the simultaneous use of sonic radiation will accelerate the digestive action of enzymes. The sonic energy will be delivered into the enzyme fluid present in the adaptor 41 from the sonic energy generator 10 in a similar manner as was described above. In this modification of invention the walls of the adaptor 41 especially the ones which are within the body should be provided with coating 41b absorbing sonic energy to prevent spreading of said sonic energy to adjacent organs. The protective coating 41b may be of wool, rubber or cork and may be applied on the outside surface of the adaptor 41 or on the inner surface of said adaptor.

The fluid if used in combination with sonic energy should be preferably of dielectric type such as oil or silicone to prevent electrical hazards to the patient. After the obstructing particle 43 was dissolved or broken up the full negative suction power is reactivated to evacuate dissolved material. The procedure may be repeated a few times till all large particles have been evacuated. The great advantage of this embodiment of invention is that this construction permits the use of strong concentrations of enzymes or other solvents for dead tissues without the danger to the patient as the fluid is isolated from walls of the organs and is prevented from entering into uterine cavity. As a further precaution at the end of treatment, the cavity of the organ may be washed out with a neutral saline fluid to remove any possible residue of enzymes.

The walls of adaptor 36 or 41 should be as thin as possible but consistent with the mechanical strength for said walls necessary to withstand the negative pressure of at least 0.95 atmosphere. It was found that specially prepared metals or laminated glass can be used in the thickness of 0.25 mm. and will withstand such negative pressure without breaking down or buckling and occluding the lumen of said adaptors.

Another embodiment of invention is shown in FIG. 7. In this modification, the breakdown of particles of evacuated material is accomplished by mechanical appliances instead of using chemical compounds or sonic radiation. In this construction, the shaft 50 is inserted into the lumen of the hollow adaptor 36 or 41. The shaft 50 is preferably a flexible rod of a small diameter such as 1 mm. in order not to obstruct the lumen of the adaptor 36 or 41. The shaft 50 preferably should be of dielectric material or if it is of a metal it may be provided with a dielectric coating. The shaft 50 is inserted into adaptor 41 beyond its opening 41a so that its head 52 is in uterine cavity. The head 52 is made of abrasive material and may comprise diamond chips or silicon oxide particles. The electric motor 53 rotates the shaft 50. The large particles 43 of the material which has to be evacuated are attracted by the negative pressure produced by the suction pump 39 to the opening 41a of the adaptor 41 and come therefore in a contact with the abrasive head 52. The rotation of the abrasive head 52 against the particle 43 causes breakdown of such particles. It should be understood that the pump 39 must produce the negative pressure in this device which is strong enough to prevent recoiling of the particles from the abrasive head 52.

In another modification of this device shown in FIG. 7A, the end of the shaft 50 which is in the uterine cavity 1a has a few small blades 54 mounted on it. The rotation of the shaft 50 causes chopping action of blades 54 against the particles 43. The negative pressure in this modification has to be strong enough to attract the particles 43 toward the blades 54 but should allow recoiling of the particles 43 as they are struck by blades 54.

There are many possible modifications of the distal end and head of the shaft 50 which may produce breakdown of evacuated particles 43 such as grinding means or milling means and it should be understood that the invention is not limited to any exclusive form of such mechanical means, as long as they produce the breakdown of particles.

It should be understood that attachment of the shaft 50 to motor 53 is demountable and interchangeable so that various shafts with various ends described above may be used in the same treatment if necessary.

In order to prevent any danger to the patient, means are provided to prevent the shaft 50 from being introduced into uterine cavity beyond a predetermined depth. The part of the shaft 50 which extends into cavity of uterus may be for example limited to 1 cm. beyond the opening 41a. A mechanical stopping member may be mounted to prevent the advance of shaft 50 beyond this predetermined depth.

It should be understood that the rotating head 52 or 54 may also operate within the lumen of adaptor 41 and will open its passage if some particles 43 should obstruct the lumen of said adaptor 41.

Instead of using rotating motion of the shaft 50 in some cases a partial rotation of said shaft 50 or a nutating motion of the shaft 50 and its head may be used. It should be understood that this modification applies to all embodiments of invention. In some cases, the shaft 50 and head 52 are excited only to establish fast vibrations such as 50–500 cycles/second instead of an actual motion. In such case the shaft 50 is connected to a mechanical vibrator.

It should be understood that all mechanical devices for the breakdown of particles 43 described above may be used in all embodiments of invention described in specification and may be used in combination with chemical means or sonic energy means.

It should be understood that all modifications of my invention described above may be used for treatment of various organs of humans and of animals as well. It should be also understood that the term supersonic and sonic waves are synonymous and embrace all forms of sonic energy regardless of their frequency.

Although there has been described a preferred embodiment of this novel invention, many variations and modifications will now be apparent to those skilled in the art. Therefore, this invention is to be limited, not by the specific disclosure herein, but only by the appending claims.

What I claim is:

1. A device for treatment of an internal hollow organ of the body and for evacuating of the matter from the cavity of said organ, said organ being the uterus and comprising a cervical canal having a narrow external orifice, said device comprising in combination a hollow member adapted in size and in shape for introducing through said orifice into said cavity of the uterus without forceful dilatation of said orifice, said hollow member having the diameter not exceeding 5 mm. and having the length at least five times larger than said diameter, means for producing negative pressure, said negative pressure being stronger than 0.9 of atmospheric pressure, means for connecting said negative pressure means to said hollow member whereby said negative pressure is transmitted to said organ causing evacuation of said matter from said cavity of said organ, walls of said hollow member having rigidity to prevent buckling of said walls upon application of said negative pressure stronger than 0.9 of normal atmospheric pressure to said walls, the walls of said connecting means furthermore having the rigidity to prevent buckling of said walls upon application of said negative pressure.

2. A device as defined in claim 1 which comprises means for injecting fluid containing enzymes which effect the breakdown of organic tissues into said hollow member and means for circulating said fluid.

3. A device as defined in claim 1 which is provided with means occluding said cervical canal to prevent the entry of air into said cavity of organ.

4. A device for treatment of an internal hollow organ of the body and for evacuating of the matter from the cavity of said organ, said organ having a narrow orifice and being the uterus, said device comprising in combination a hollow member adatped in size and in shape for introducing through said narrow orifice into said cavity of the uterus, means for producing negative pressure, said negative pressure being stronger than 0.5 of normal atmospheric pressure, means for connecting said negative pressure means to said hollow member whereby said negative pressure is transmitted to said organ causing reduction of the size of said cavity of said organ, said device comprising furthermore means for reducing the size of particles of said evacuated matter in said cavity of said organ so that said reduced particles can pass through said hollow member, said device comprising furthermore means for producing sonic energy and means for transmitting said sonic energy into said hollow member.

5. A device for treatment of an internal hollow organ of the body and for evacuating of the matter from the cavity of said organ, said organ having a narrow orifice and being the uterus, said device comprising in combination a hollow member adapted in size and in shape for introducing through said orifice into said cavity of the uterus, said hollow member having the length at least five times larger than its diameter, means for producing negative pressure, said negative pressure being stronger than 0.5 of atmospheric pressure, means for connecting said negative pressure means to said hollow member whereby said negative pressure is transmitted to said organ causing reduction of the size of said cavity of said organ walls of said hollow member having ridigity to prevent buckling of said walls upon application of the negative pressure stronger than 0.5 of normal atmospheric pressure to said walls, said device comprising furthermore means for injecting fluid into said hollow member, and means for producing sonic energy and means for transmitting said sonic energy into said hollow member.

6. A device for treatment of an internal hollow organ of the body and for evacuating of the matter from the cavity of said organ, said organ having a narrow orifice and being the uterus, said device comprising in combination a hollow member adapted in size and in shape for introducing through said narrow orifice into said cavity of the uterus, means for producing negative pressure, said negative pressure being stronger than 0.5 of atmospheric pressure, means for connecting said source of negative pressure to said hollow member whereby said negative pressure is transmitted to said organ causing reduction of the size of said cavity of said organ, said device comprising furthermore means for preventing entry of air into said cavity of said organ through the space outside of said hollow member, and means for producing sonic energy and means for transmitting said sonic energy into said hollow member.

7. A device as defined in claim 1, in which said walls of said hollow member are of laminated glass.

References Cited

UNITED STATES PATENTS

| | | | |
|---|---|---|---|
| 3,316,910 | 5/1967 | Davis | 128—227 |
| 1,444,714 | 2/1923 | Teshima | 128—278 |
| 1,245,845 | 11/1917 | White | 128—278 |

LAWRENCE W. TRAPP, Primary Examiner

U.S. Cl. X.R.

128—276